United States Patent
Djukic et al.

(10) Patent No.: US 9,871,582 B2
(45) Date of Patent: Jan. 16, 2018

(54) OPTICAL CHANNEL TELEMETRY

(71) Applicants: Petar Djukic, Ottawa (CA); David Cote, Gatineau (CA)

(72) Inventors: Petar Djukic, Ottawa (CA); David Cote, Gatineau (CA)

(73) Assignee: Cienna Corporation, Hanover, MD (US)

( * ) Notice: Subject to any disclaimer, the term of this patent is extended or adjusted under 35 U.S.C. 154(b) by 46 days.

(21) Appl. No.: 14/959,632

(22) Filed: Dec. 4, 2015

(65) Prior Publication Data

US 2017/0163337 A1 Jun. 8, 2017

(51) Int. Cl.
*H04B 10/079* (2013.01)
*H04B 10/27* (2013.01)
*H04L 12/26* (2006.01)

(52) U.S. Cl.
CPC ........... *H04B 10/079* (2013.01); *H04B 10/27* (2013.01); *H04L 43/16* (2013.01)

(58) Field of Classification Search
CPC .................................. H04B 10/075–10/07957
See application file for complete search history.

(56) References Cited

U.S. PATENT DOCUMENTS

| | | | |
|---|---|---|---|
| 2016/0142136 A1* | 5/2016 | Izumi | H04B 10/07955 398/38 |
| 2016/0226683 A1* | 8/2016 | Zhao | H04L 27/0006 |
| 2016/0269110 A1* | 9/2016 | Dahan | H04B 10/0793 |

OTHER PUBLICATIONS

M. Karlsson, "Four-dimensional Rotations in Coherent Optical Communications", Journal of Lightwave Technology, vol. 32, No. 6, Mar. 2014.*
Krummrich, P. M.; Kotten, K., "Extremely fast (microsecond timescale) polarization changes in high speed long haul WDM transmission systems", in Optical Fiber Communication Conference, 2004, OFC 2004, vol. 2, Feb. 23-27, 2004 (3 pages).
Woodward, S. L. et al., "Long-Term Observation of PMD and SOP on Installed Fiber Routes", IEEE Photonics Technology Letters, vol. 26, No. 3, Feb. 1, 2014 (4 pages).

* cited by examiner

Primary Examiner — Shi K Li
(74) Attorney, Agent, or Firm — Osha Liang LLP

(57) ABSTRACT

A method for performing optical channel telemetry. The method may include generating various channel estimates of an optical channel, wherein the channel estimates are generated by an optical detector. The method may further include determining, from the channel estimates, various channel properties regarding the optical channel. The method may further include determining, using a summarization function and the channel properties, a channel summary that describes a portion of the optical channel during a predetermined period of time. The predetermined period of time corresponds to a processor interval of a computer processor. The method may further include transmitting, over a network, the channel summary to an optical network controller.

18 Claims, 11 Drawing Sheets

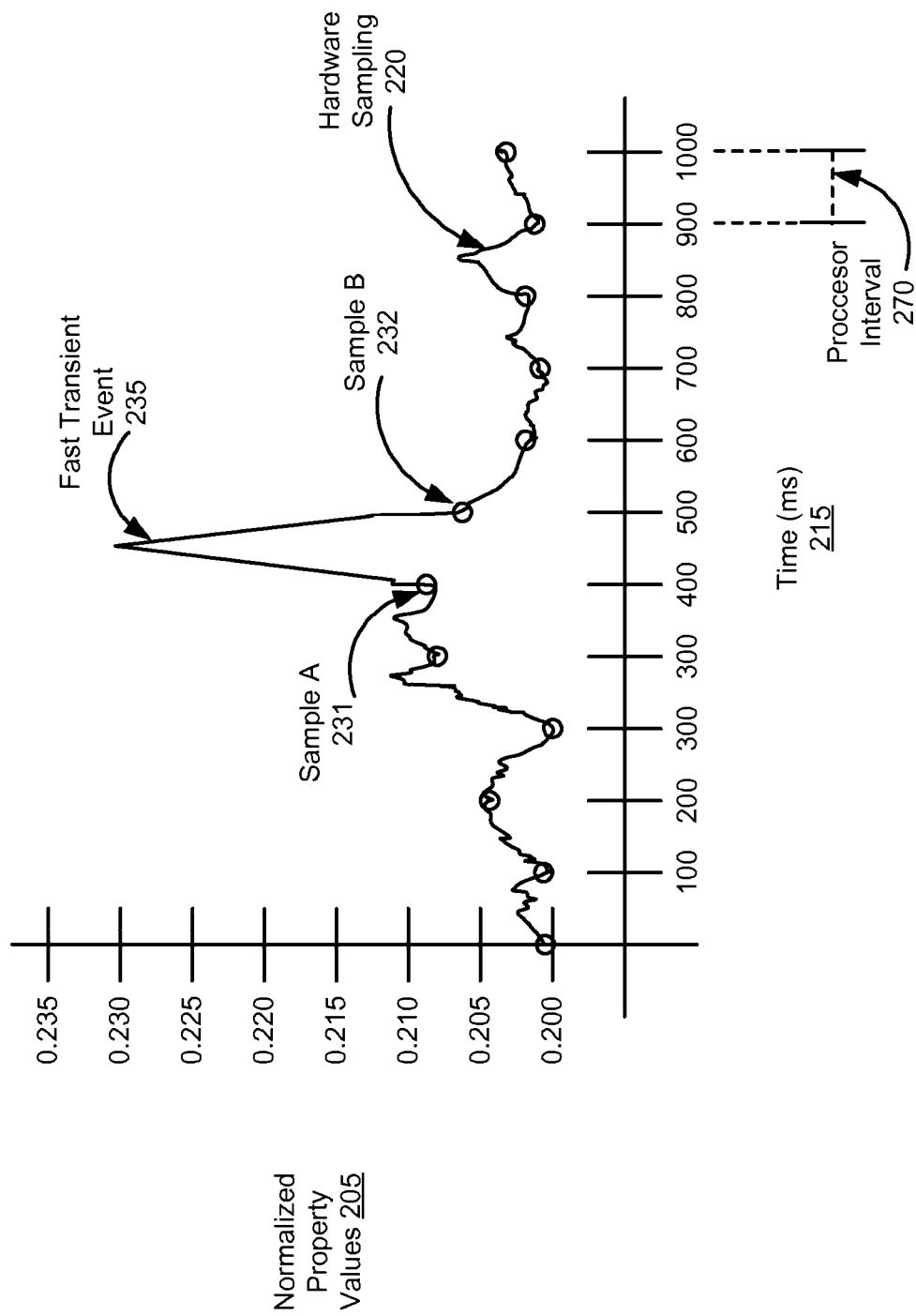
FIG. 2.1

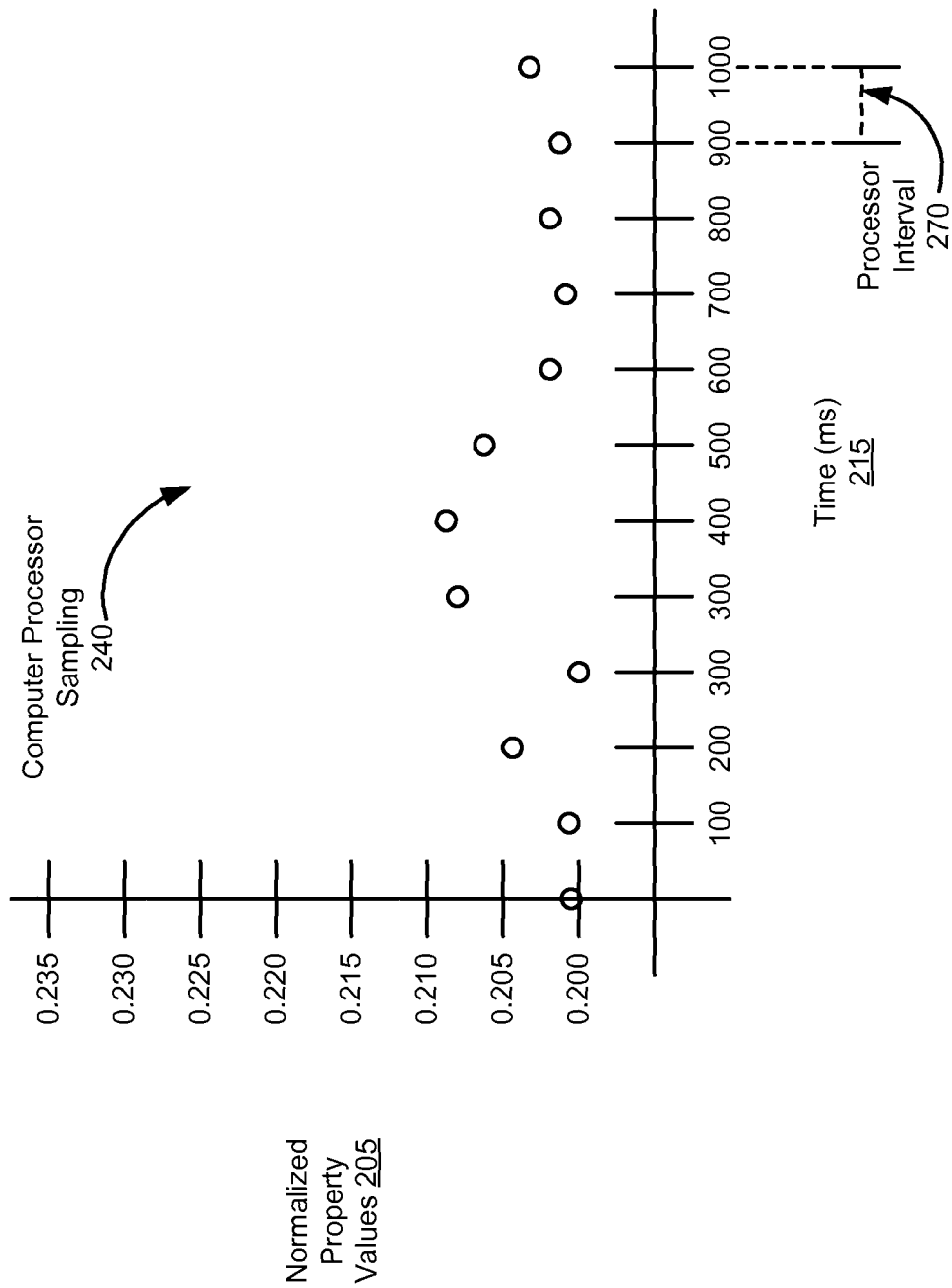
FIG. 2.2

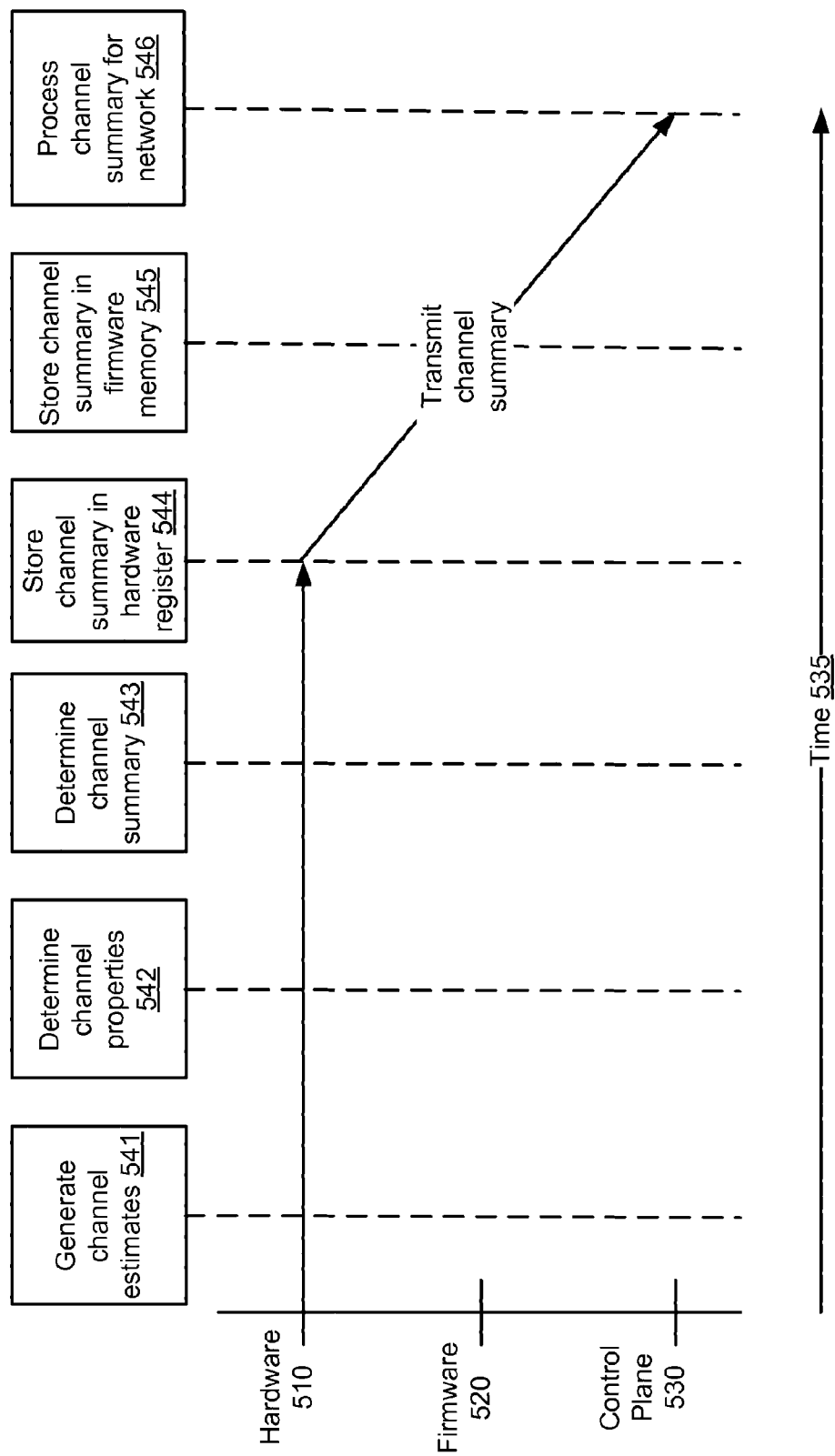
FIG. 5.1

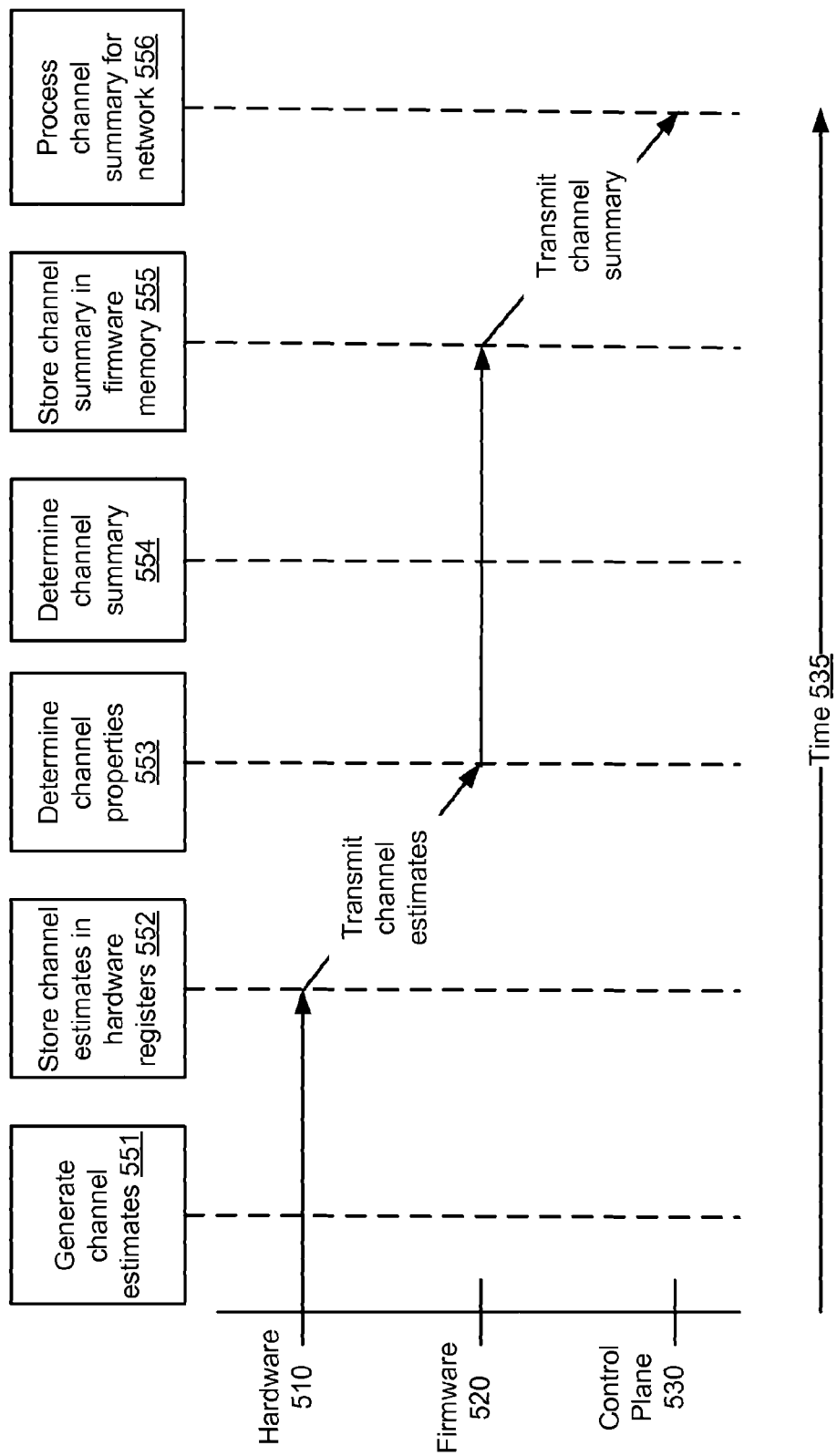
FIG. 5.2

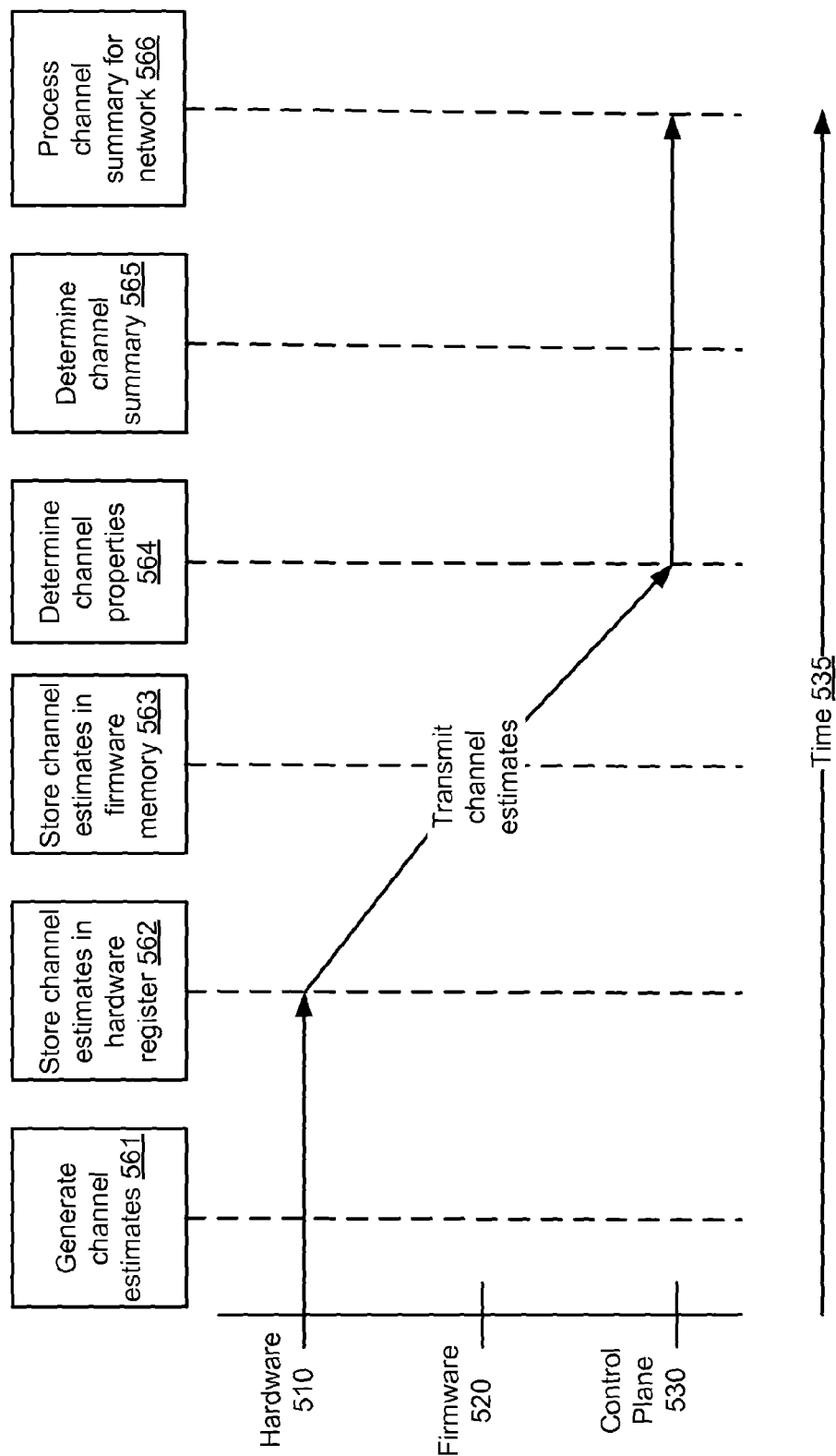
FIG. 5.3

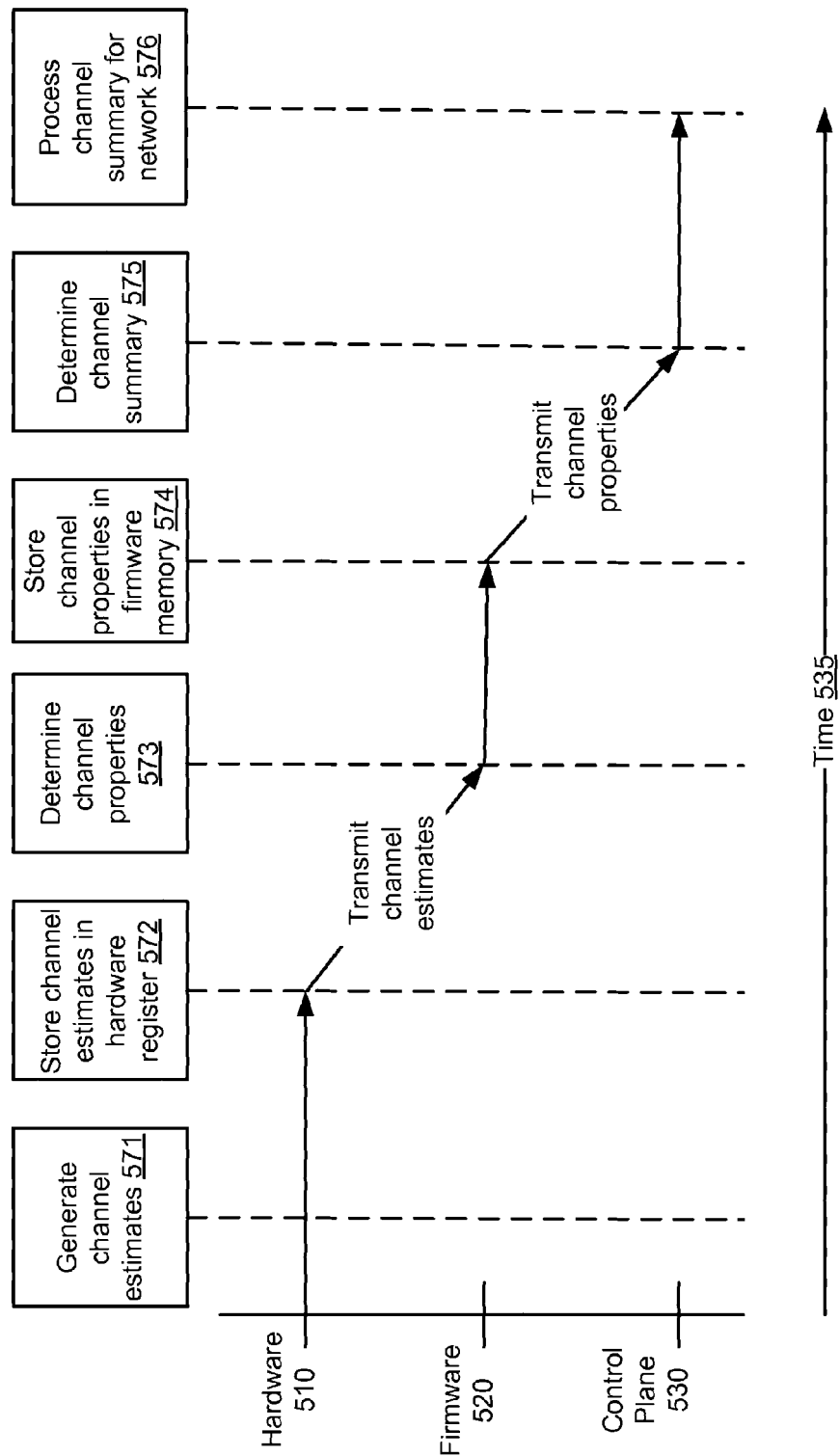
FIG. 5.4

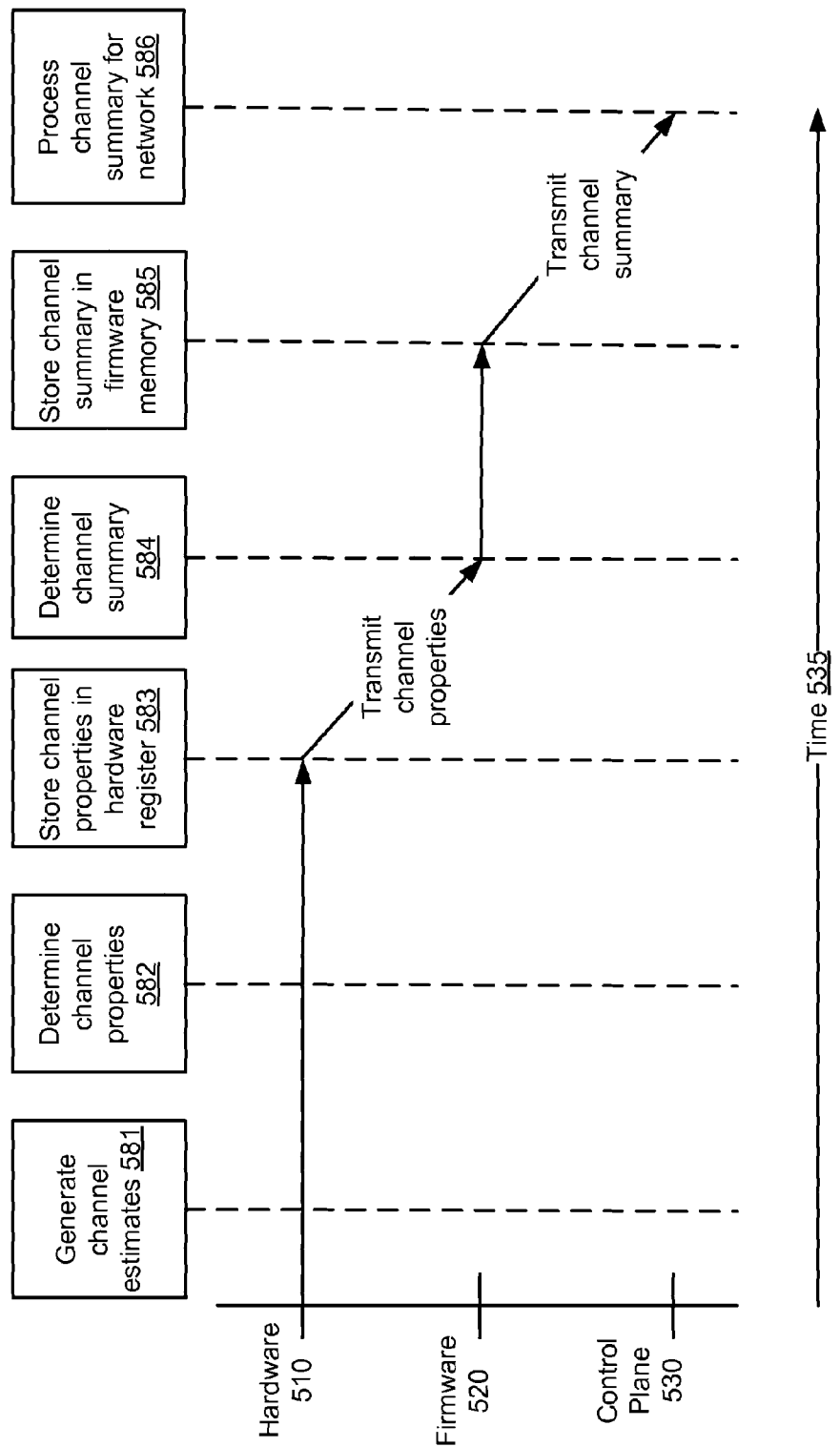
FIG. 5.5

OPTICAL CHANNEL TELEMETRY

BACKGROUND

Optical networks may transfer data over light waves. For example, a particular light wave may be generated at a transmitter and forwarded over an optical network to a receiver. Using an optical protocol, various light waves may be multiplexed using different frequency channels for transmission through the same transmission medium to various receivers. At the receivers, the light waves may be decoded into electrical signals.

SUMMARY

In general, in one aspect, embodiments relate to a method for performing optical channel telemetry. The method includes generating various channel estimates of an optical channel, wherein the channel estimates are generated by an optical detector. The method further includes determining, from the channel estimates, various channel properties regarding the optical channel. The method further includes determining, using a summarization function and the channel properties, a channel summary that describes a portion of the optical channel during a predetermined period of time. The predetermined period of time corresponds to a processor interval of a computer processor. The method further includes transmitting, over a network, the channel summary to an optical network controller.

In general, in one aspect, the invention relates to a network element. The network element includes a computer processor and a computer memory coupled to the computer processor. The network element further includes an optical detector coupled to an optical transmission medium. The optical detector generates various channel estimates of an optical channel. The optical detector further determines, from the channel estimates, various channel properties regarding the optical channel. The network element further includes an optical summarizer coupled to the computer memory and the optical detector. The optical summarizer determines, using a summarization function and the channel properties, a channel summary that describes a portion of the optical channel during a predetermined period of time. The predetermined period of time corresponds to a processor interval of the computer processor. The computer processor transmits, over a network, the channel summary to an optical network controller.

In general, in one aspect, the invention relates to a non-transitory computer readable medium (CRM) storing a plurality of instructions for performing optical channel telemetry. The instructions, when executed by a computer processor, include functionality for obtaining, from hardware in an optical detector, various channel estimates of an optical channel. The instructions further include functionality for determining, from the channel estimates, various channel properties regarding the optical channel. The instructions further include functionality for determining, using a summarization function and the channel properties, a channel summary that describes a portion of the optical channel during a predetermined period of time. The predetermined period of time corresponds to a processor interval of a processor. The instructions further include functionality for transmitting the channel summary to a computer device.

Other aspects of the invention will be apparent from the following description and the appended claims.

BRIEF DESCRIPTION OF DRAWINGS

FIGS. 2.1 and 2.2 show example graphs in accordance with one or more embodiments.

FIGS. 5.1, 5.2, 5.3, 5.4, and 5.5 show examples in accordance with one or more embodiments.

DETAILED DESCRIPTION

Figure 1:
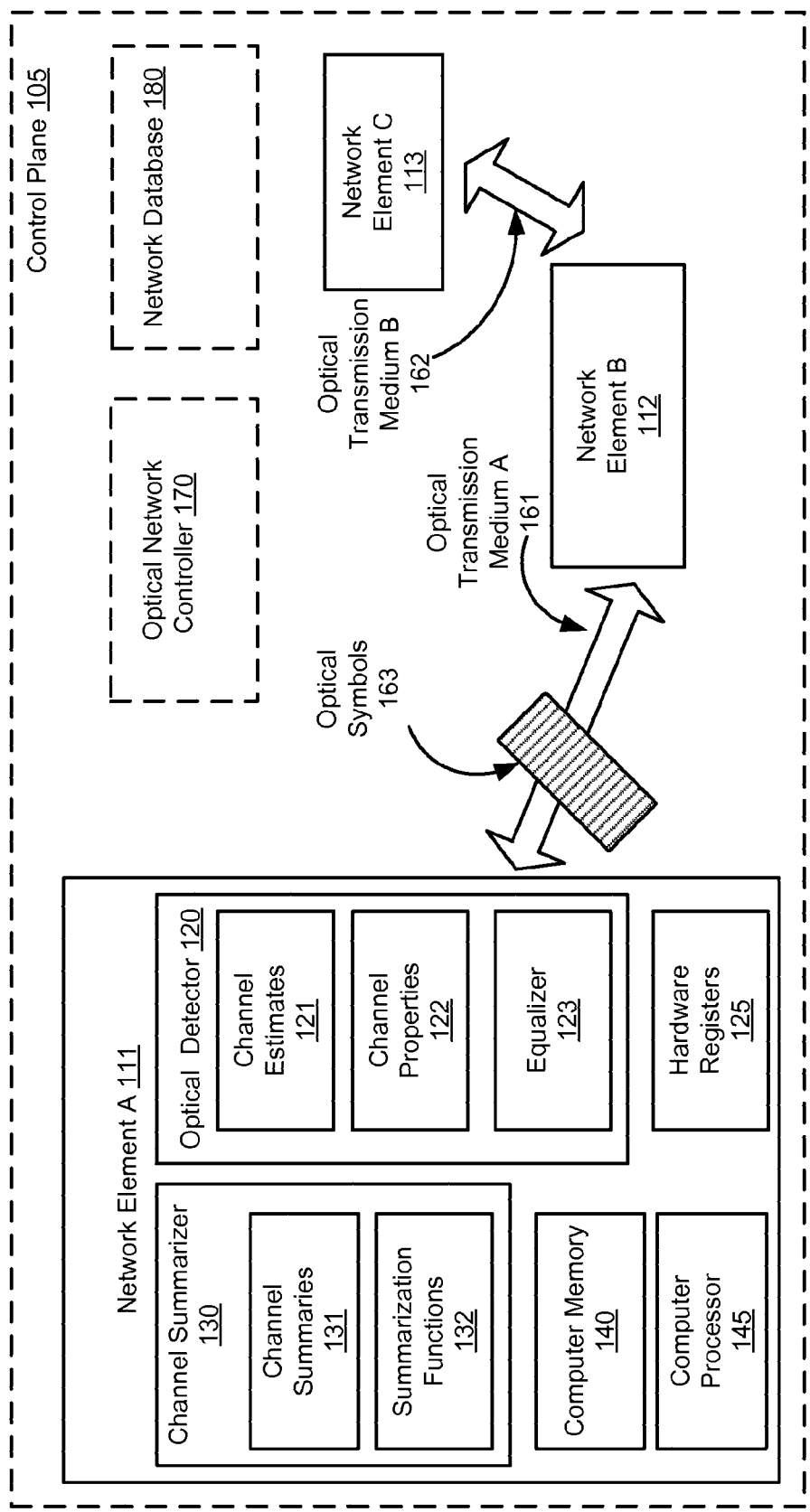
FIG. 1 shows systems in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention include a method, a system, and a non-transitory computer readable medium for performing optical telemetry. In particular, one or more embodiments are directed to a method that involves generating various channel estimates of an optical channel. These channel estimates may be obtained according to a rate faster than a processing rate of a computer processor. In other words, the channel estimates may detect fast transient events within an optical channel that occur faster than the computer processor is capable of handling. Thus, channel properties may be determined from the channel estimates, and the channel properties may be further analyzed using a summarization function. As such, the summarization function may produce a channel summary of a period of time that can capture information regarding fast transient events that may otherwise be undetected by a processor interval corresponding to a computer processor sampling rate.

FIG. 1 shows a block diagram of a system in accordance with one or more embodiments. In one or more embodiments, as shown in FIG. 1, various network elements (e.g., network element A (111), network element B (112), network element C (113)) are operably connected with various optical transmission media (e.g., optical transmission medium A (161), optical transmission medium B (162)). A network element may refer to various components such as optical switches, routers, hubs or any other logical entities for uniting one or more physical devices on a network. A network element may be implemented using hardware and software, and include a computer memory (140) and a computer processor (145). An optical transmission medium may refer to a type of physical medium, such as a single mode optical fiber, that includes functionality to transport an optical signal between a pair of network elements. An optical transmission medium may include functionality to transmit various optical symbols (163) between the network elements (111, 112, 113).

Furthermore, the network element A (111) may include an optical detector (120). An optical detector (120) may include hardware and/or firmware that includes functionality to detect one or more optical symbols (163) within an optical signal transmitted over the optical transmission medium A (161). An optical symbol may be a portion of an optical signal that corresponds to data, e.g., one or more bits of a data signal. In particular, the optical detector (120) may include functionality to equalize the one or more optical symbols (163) to produce estimated symbols for detection and/or decoding. Thus, the network element A (111) may transform the estimated symbols into corresponding bits.

In one or more embodiments, the optical detector (120) includes functionality to estimate various effects within an optical channel that affect the transmission of optical symbols over the optical transmission medium A (161). For example, with respect to different optical channels, an optical symbol may be transmitted over an optical channel having x-polarization in phase (XI), over an optical channel having an x-polarization out of phase (XQ), over an optical channel having a y-polarization in phase (YI), and/or over an optical channel having a y-polarization out of phase (YQ). Thus, the optical detector (120) may generate various channel estimates (121) with respect to optical symbols (163). In particular, the channel estimates (121) may refer to various linear effects and/or channel impairments within the optical transmission medium A (161) that affect the optical symbols (161). In one or more embodiments, the channel estimates are generated at an estimation rate that is approximately the same as the rate that the optical symbols (163) are received, e.g., sub-nano second times.

The optical detector (120) may also include functionality to determine one or more channel properties (122) of an optical channel for the optical transmission medium A (161). For example, the channel properties (122) may refer to various observed physical values of the optical transmission medium A (161) relating to optical effects such as chromatic dispersion (CD), differential group delay (DGD), polarization-dependent loss, and polarization state transformation. The channel properties (122) may also refer to multidimensional values such as Stoke's parameters and/or frequency response functions. Thus, a channel property may be a scalar value for a corresponding optical effect, a range of values as specified by a function, and/or a multidimensional vector quantity. Furthermore, the channel properties (122) may change over time and thus may indicate external events to an optical network. For example, optical properties may change due to external stimuli that include electromagnetic discharge (e.g. lighting), fiber tampering, fiber conduit vibration, temperature changes, impairments to network equipment, and/or network rack vibrations and others. In one or more embodiments, the optical detector (120) stores the channel estimates (121) and/or channel properties (122) in various hardware registers (123).

In one or more embodiments, the network element (111) includes a channel summarizer (130). In one or more embodiments, a channel summarizer (130) includes functionality to determine a value of a channel summaries (131) using one or more of the channel properties (122). In other words, a channel summarizer (130) may analyze one of more of the channel properties (122) within a specified period of time to produce a corresponding value for a channel summary. In one or more embodiments, a channel summary refers to a desired property determined with respect to an optical channel during a specified period of time. In one or more embodiments, for example, a channel summary may be an observed change of an optical channel for the optical transmission medium A (161) that may not be captured if the optical channel is sampled at a periodic interval, e.g., decimated using a sampling interval. In one or more embodiments, a channel summary indicates various characteristics of a change within an optical channel, such as the start of the change, the duration of the change, an intensity of the change, and/or a unique signature of the change.

In one or more embodiments, the channel summarizer (130) includes functionality to determine a channel summary using one or more summarization functions (132). A summarization function may refer to a mathematical function that includes functionality for analyzing various channel properties within a period of time. For example, a summarization function may determine the total amount of change in an optical channel during a specified period of time. In one or more embodiments, the total amount of change is determined by finding a line integral over the trajectory of the determined channel property. The summarization function may determine when a change occurs during a specified period of time, e.g., during a sampling interval.

In one or more embodiments, a summarization function is a signature function that specifies a particular type of output using one or more inputs, where individual channel properties are the inputs. For example, signature functions may include functions that determine a maximum value of the channel properties, determine the sum of the channel properties within a period of time, determine the sum of the absolute value of the channel properties, determine the difference between the channel properties, determine the absolute difference between channel properties, and/or determine the maximum absolute difference between channel properties within a period of time. Summarization functions may also include scaled versions of one or more signature functions. For example, a summarization function may determine an average instead of a sum. Another summarization function may obtain a time average for non-uniform times. A summarization function may also be a weighted function. In one or more embodiments, channel properties are analyzed using a summarization function with an intuitive explanation. For example, the summarization function may correspond to a 4-dimensional Stoke's vector where the sum of absolute differences corresponds to the distance traveled on the Poincare sphere.

In one or more embodiments, a summarization function is a characteristic function. In one or more embodiments, for example, the summarization function is a discrete Fourier transform. Thus, the summarization function may produce various Fourier coefficients from channel properties during a specified period of time. Thus, the channel summary produced with a discrete Fourier transform may indicate whether a transient event is above a specified threshold using the Fourier coefficients.

In one or more embodiments, a summarization function may also be a polynomial approximation. In another example, the channel properties (122) may be approximated as an autoregressive moving average model. As such, the coefficients of the model may be stored as the channel summary. In another example, the summarization function may be a principle component analysis of an autocorrelation function. For example, the summarization function may determine a particular autocorrelation function that uses singular value decomposition to determine the principle components within an optical channel. Accordingly, a channel summary may include a specified number of the principle components. In one or more embodiments, the summarization function may estimate the spectral density of an optical channel, such as through a periodogram. Thus, the signature function may determine a particular autocorrelation function that determines a frequency representation of the respective autocorrelation function.

The network elements (111, 112, 113) may be part of a control plane (105). In particular, the control plane (105) may be part of a network architecture that includes hardware and/or software configured for routing data and establishing links and/or network connections between the network elements (111, 112, 113) within a network (not shown). Thus, the control plane (105) may include functionality for monitoring and managing various network services over the network by operating on the network elements (111, 112, 113). As such, the control plane (105) may implement a network topology for use by a data plane (not shown) for forwarding packets to endpoints over the network.

The control plane (105) may include an optical network controller (170). The optical network controller (170) may refer to a software-defined network controller operating on the control plane (105) that includes functionality to administer the optical network. For example, the optical network controller (170) may gather information regarding various optical channels used throughout the optical network to transmit optical symbols between the network elements (141, 142, 143). Thus, the optical network controller (170) may perform optical telemetry between nodes in order to determine faults, interference, and other events through the optical network. The control plane (105) may further include a network database (180) in the network. In one or more embodiments, the network database (180) includes functionality to store channel summaries, channel properties, and/or channel estimates obtained over a network.

While FIG. 1 shows a configuration of components, other configurations may be used without departing from the scope of the invention. For example, various components may be combined to create a single component. As another example, the functionality performed by a single component may be performed by two or more components.

Turning to FIGS. 2.1 and 2.2, FIGS. 2.1-2.2 illustrate a channel property graph for an optical channel in accordance with one or more embodiments. In particular, FIG. 2.1 shows an example graph of hardware sampling (220) overlaying computer processor sampling (240). One axis corresponds to time (215) as determined in milliseconds, while the other axis corresponds to normalized property values (205) of the optical channel. In one or more embodiments, for example, the hardware sampling (220) of an optical detector is obtained by hardware processing of channel estimates to determine respective channel properties of the optical channel. While the hardware sampling (220) may be seen as a continuous line in FIG. 2.1, a person of ordinary skill in the art would recognize that the hardware sampling (220) is at much smaller increments than the computer processor sampling (240) and thus illustrated as a continuous line for convenience. On the other hand, the computer processor sampling (240) may illustrate a computer processor (not show) obtaining samples of the hardware processed channel properties at a processor interval (270). As shown in FIGS. 2.1-2.2, the processor interval (270) is an example of a periodic sampling rate where the computer processor obtains a sample every 100 milliseconds. Thus, a fast transient event (235) determined by the optical detector sampling (220) may be missed by the computer processor sampling (240), because the fast transient event (235) falls between sample A (231) and sample B (232). In one or more embodiments, accordingly, determining a channel summary between sample A (231) and sample B (232) using hardware and/or firmware provides for the capture of information regarding the fast transient event (235) that the computer processor sampling (240) may not access. While FIGS. 2.1 and 2.2 illustrate one embodiment, a person of ordinary skill in the art would recognize that other embodiments are contemplated that are within the scope of the invention. In other words, the examples in FIGS. 2.1 and 2.2 are for explanatory purposes only and not intended to limit the scope of the invention. For example, other types of transient events may occur that vary the graphs, different sampling rates of the computer processor may exist, and other variations of FIGS. 2.1 and 2.2 may occur without departing from one or more embodiments of the invention.

Figure 3:
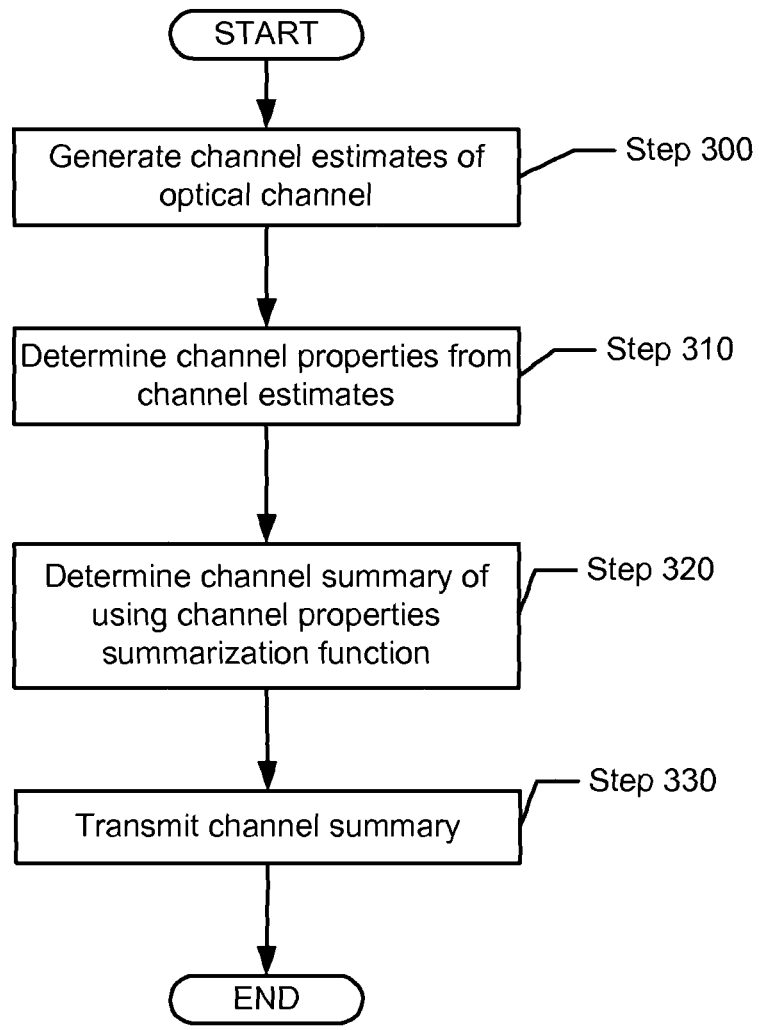
FIGS. 3 and 4 show flowcharts in accordance with one or more embodiments.

FIG. 3 shows a flowchart in accordance with one or more embodiments. Specifically, one or more steps in FIG. 3 may be performed by one or more components of the system as described in FIG. 1. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 300, various channel estimates of an optical channel are generated in accordance with one or more embodiments. In one or more embodiments, an optical detector may generate an estimate of an optical channel as part of the process for coherent optical reception. In particular, the optical detector may use various estimation algorithms to determine an original optical symbol from an optical symbol received at the optical detector over a respective optical channel. For example, an equalizer in the optical detector may use a series of equalizing filters to equalize a received optical signal having the optical symbols. The equalizing filters may iteratively model various effects of the optical channel to produce an estimated optical symbol. Accordingly, the optical detector may similarly determine the observed quantities of effects within the optical channel during the equalizing process.

In Step 310, various channel properties are determined from various channel estimates in accordance with one or more embodiments. In particular, the channel estimates from Step 300 may be used to determine individual channel properties of the optical channel. In particular, a channel estimate may be used to determine individual channel properties regarding a particular optical channel. For example, a channel estimate may provide an optical communication channel impulse response, which may be decomposed into impulse responses of various optical properties such as chromatic dispersion, differential group delay, polarization-dependent loss, etc.

In Step 320, a channel summary is determined using various channel properties and a summarization function in accordance with one or more embodiments. In particular, a summarization function may be applied to selected channel properties from Step 310. For example, hardware and/or firmware in an optical detector may select a particular channel property depending on the type of summarization function, and determine a channel summary accordingly.

In one or more embodiments, for example, if the summarization function determines a sum of maximum absolute differences, hardware in the optical detector may select the channel properties within a period of time that have the largest absolute values. Thus, hardware in the optical detector may compute the difference in the largest absolute values to produce the channel summary. In one or more embodiments, for example, a summarization function may determine an absolute value of the difference between different channel properties. Thus, the channel summary may be an accumulation of various absolute differences between various channel properties over time produced by summing the absolute differences together.

In Step 330, a channel summary is transmitted for processing in accordance with one or more embodiments. Based on the channel summary determined in Step 320, the channel summary may be transmitted to memory or a computing device in a network element and relayed over a network. In one or more embodiments, for example, the channel summary is transmitted to an optical network controller in a control plane for processing with various other channel summaries obtained by other network elements. Thus, an optical network controller may manage an optical network using various channel summaries to detect network events throughout the network.

In one or more embodiments, the channel summary is processed with respect to a machine learning algorithm operating on a network element. In particular, a channel summary and/or channel property may be classified according to various categories before further processing. This classification may be performed using support vector machines or k-nearest neighbor algorithms. Thus, the channel properties determined in Step 310 may be associated with various historical properties of a particular optical channel, such as by appending historical property information to data regarding the channel properties. Accordingly, channel summaries and/or channel properties may be used with various statistical techniques, such as histogram binning for a probability density function (PDF), and/or mean and variance estimation for parametric PDF estimation.

In one or more embodiments, various classification zones are used to separate channel properties obtained in Steps 300-310 for further processing by a network element or an optical network controller. In one or more embodiments, a network element or an optical network controller determines the classification zones using statistical sampling on the channel properties. Thus, a particular classification zone may determine a particular type of channel property in an optical channel.

Furthermore, one or more of the classification zones may be continuously adjusted based on newly obtained channel properties by comparing the newly obtained channel property to historical properties regarding one or more optical channels. In one or more embodiments, as such, classification zones are adjusted by an optical network controller using channel properties obtained over a control plane. In one or more embodiments, a machine learning algorithm adjusts various classification zones to produce adjusted classification zones for future use by a network element or the optical network controller.

In one or more embodiments, a classification zone is designated for a channel property and/or channel summary based on comparing values of channel properties with threshold values. If a particular channel property value exceeds a threshold value, a corresponding channel property may be assigned to a particular classification zone. If the particular channel property value fails to exceed the threshold value, the corresponding channel property may be assigned to a different classification zone.

Figure 4:
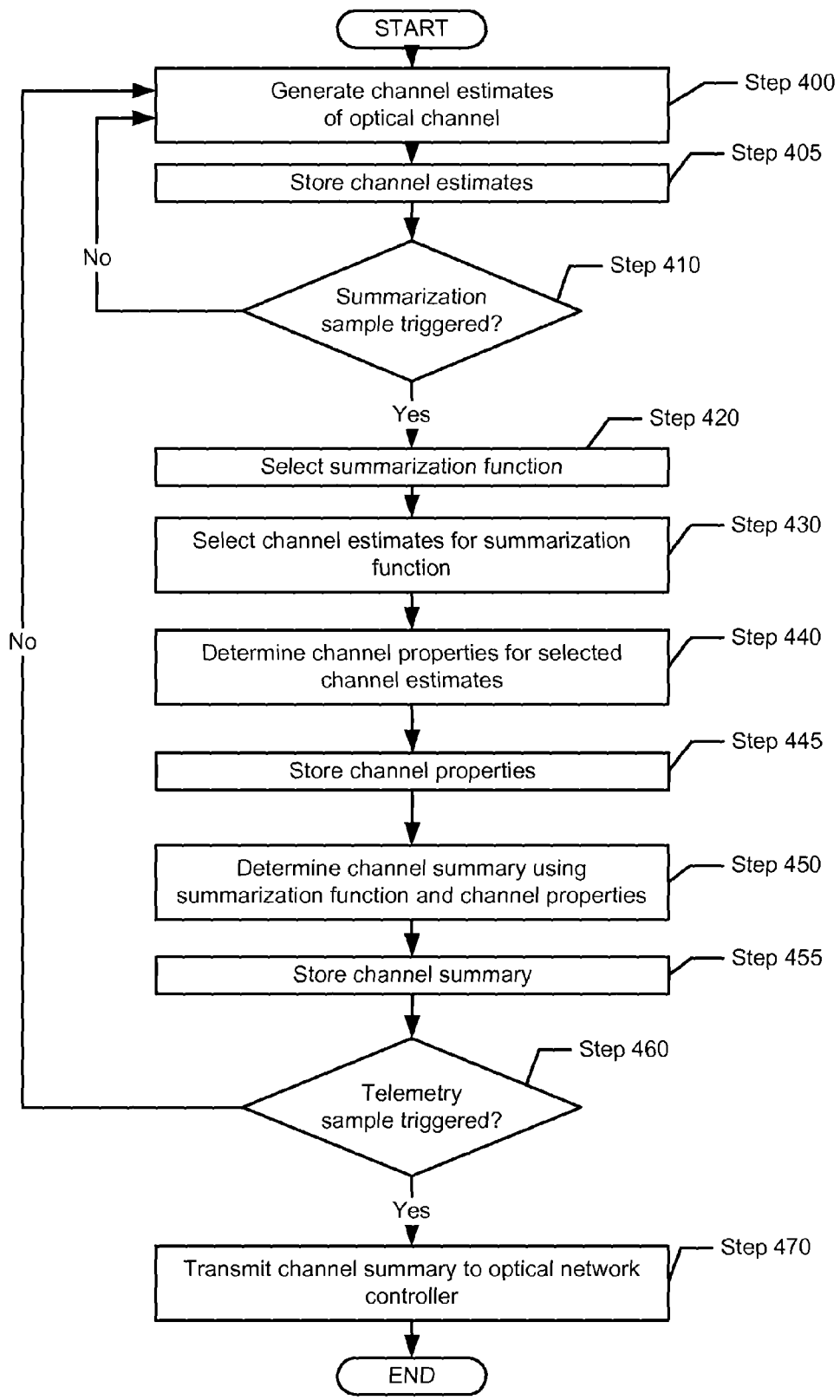

FIG. 4 shows a flowchart in accordance with one or more embodiments. Specifically, one or more steps in FIG. 4 may be performed by one or more components of the system as described in FIG. 1. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 400, various channel estimates of an optical channel are generated in accordance with one or more embodiments. In particular, channel estimates may be generated in a similar manner as described with respect to Step 300 above. As such, a channel estimate may be obtained for each optical symbol received over an optical transmission medium. Thus, the channel estimates may be generated using hardware in an optical detector at approximately the same sampling rate that an optical detector performs coherent detection on the optical symbols. In one or more embodiments, for example, the channel estimates are generated according to a rate that an equalizer updates the channel estimate that is used for estimating optical symbols obtained over an optical transmission medium. In one or more embodiments, the channel estimates are generated according to the rate that optical symbols are transmitted to an optical detector. In one or more embodiments, the channel estimates in Step 400 are generated at a rate that hardware in the optical detector samples the channel estimates produced by an equalizer. Accordingly, channel estimates may be generated at a rate that is faster than the processing rate of a computer processor in a network element.

In Step 405, various channel estimates are stored in accordance with one or more embodiments. With respect the channel estimates from Step 400, in one or more embodiments, the channel estimates are stored in a hardware register for further processing by hardware and/or firmware in an optical detector. In one or more embodiments, the channel estimates are obtained by firmware and stored directly in firmware memory for further processing by the firmware.

In Step 410, a determination is made whether a summarization sample is triggered in accordance with one or more embodiments. In one or more embodiments, a summarization sample is defined as a range of channel estimates for use in determining a channel summary Thus, a summarization sample trigger, for example, may specify a period of time for generating the channel estimates in Step 400. For example, the summarization sample trigger may be a message transmitted by hardware, firmware, and/software on a network element. In one or more embodiments, for example, the period of time designated by the summarization sample trigger corresponds to a periodic interval. This periodic interval may correspond to a processor interval for a computer processor operating a software application. In other words, the channel estimates from Step 400 may be sampled at a periodic interval such that a channel summary may be determined for channel estimates within the periodic interval as described in Steps 420-455 below.

In one or more embodiments, a summarization sampling trigger is produced by firmware and/or a computer processor polling a hardware register. In one or more embodiments, hardware in an optical detector automatically defines the summarization sample by transmitting the channel estimates to a firmware memory and/or computer memory after generating a specified number of channel estimates.

When a determination is made that a summarization sampling is triggered, the process may proceed to Step 420.

When a determination is made that the summarization sampling has not been triggered, the process may proceed to Step 400.

In Step 420, a summarization function is selected in accordance with one or more embodiments. In one or more embodiments, a summarization function is selected by firmware or software for use with the channel estimates generated in Step 400 above. For example, the summarization function may be selected based on the type of channel property being analyzed by a network element and/or control plane. In one or more embodiments, the summarization function is specified within hardware of an optical detector or other hardware in a network element.

In Step 430, various channel estimates are selected for a summarization function in accordance with one or more embodiments. Depending on the type of summarization function selected in Step 420, channel estimates from Step 400 are selected for use with the summarization function. The selection of the channel estimates may be performed automatically by hardware, firmware, and/or software.

In Step 440, various channel properties are determined for various channel estimates in accordance with one or more embodiments. Specifically, using the selected channel estimates from Step 430, respective channel properties may be determined accordingly. The channel properties may be determined in a similar manner as Step 310 above.

In Step 445, various channel properties are stored in accordance with one or more embodiments. The channel properties from Step 440 may be stored in a hardware register, firmware memory, and/or computer memory in a network element, such as one on a control plane.

In Step 450, a channel summary is determined using a summarization function and various channel properties in accordance with one or more embodiments. In one or more embodiments, the summarization function selected in Step 420 is performed on the selected channel estimates from Step 430. Thus, the output of the summarization function may be the channel summary. In one or more embodiments, multiple summarization functions are used to determine the channel summary.

In one or more embodiments, for example, a summarization function determines a value of one channel property and determines the difference with another value of the same channel property. Then, the summarization function may determine whether the difference exceeds a specified threshold. Thus, the channel summary may be a binary value regarding whether the difference exceeds the threshold, or the channel summary may be the determined difference between the two values. On the other hand, the channel summary may also be the amount of a difference above the threshold.

In one or more embodiments, for example, two or more summarization functions are daisy chained together in order to determine the channel summary. For example, an output of a summarization function may be compared with a particular threshold to determine whether a particular event has occurred within an optical network. With multiple summarization functions, multiple thresholds may be used to classify and/or determine the type of event within an optical network based on one or more changes observed in an optical channel. Thus, a channel summary may provide an observation of these changes using the selected channel properties from Step 440.

In one or more embodiments, the summarization function is an accumulation function. In particular, the summarization function may generate an accumulated amount of change in a particular channel property over a period of time. In other words, the summarization function may sum individual changes of a channel property to produce the accumulated change. Thus, the accumulated change may describe different values of a channel property over multiple periods of time, e.g., multiple processor intervals. In one or more embodiments, rather than storing individual channel properties within a hardware register or firmware memory, channel property values may be accumulated for use with a summarization function. Accordingly, the summarization function may determine whether the accumulated change is above a particular threshold for computing the channel summary.

In Step 455, a channel summary is stored in accordance with one or more embodiments. The channel summary from Step 450 may be stored in a hardware register, firmware memory, and/or computer memory in a network element, such as a network element on a control plane.

In Step 460, a determination is made whether a telemetry sample is triggered in accordance with one or more embodiments. In one or more embodiments, channel summaries are collected automatically or in response to a request from a computing device. Thus, a telemetry sample trigger, for example, may specify a type of channel property to be obtained from a particular network element or optical detector. For example, the telemetry sample trigger may be a message transmitted by hardware, firmware, and/or software transmitted by a network element or over a control plane, e.g., by an optical network controller. In one or more embodiments, a network element determines whether a threshold is exceeded with respect to a channel summary for a particular channel property. If the threshold is exceeded, the network element automatically transmits the channel summary to a computing device. If the channel summary fails to exceed the threshold, the network element may ignore the channel summary. In one or more embodiments, the telemetry sample is designated a particular number of channel summaries before transmission to a computing device. Thus, Steps 400-460 may be performed iteratively until a change in an optical network is detected or as a continuous method to monitor channel properties throughout the optical network.

When a determination is made that a telemetry sample is triggered, the process may proceed to Step 470. When a determination is made that the telemetry sample has not been triggered, the process may proceed to Step 400.

In Step 470, one or more channel summaries are transmitted to an optical network controller in accordance with one or more embodiments. In response to detecting that a telemetry sample is triggered, a network element may transmit the one or more channel summaries to an optical network controller on a control plane. In other words, various channel summaries may be collected and/or stored over Steps 400-460 iteratively until a telemetry sample is requested or the designated time for transmitting channel summaries is reached. Then, one or more channel summaries stored in Step 455 may be relayed to the optical network controller in Step 470. Thus, the optical network controller may collect channel summaries from various network elements on an optical network. As such, the optical network controller may aggregate the channel summaries in an network database on a control place. Accordingly, the optical network controller may administer and manage an optical network using information from the network database.

Turning to FIGS. 5.1, 5.2, 5.3, 5.4, and 5.5, FIGS. 5.1-5.5 show various examples for performing optical telemetry. The following examples are for explanatory purposes only and not intended to limit the scope of the invention. As shown in FIG. 5.1-5.5, various operations may be performed by hardware (510), firmware (520), and/or a control plane (530) as described with respect to time (535). The hardware (510) and/or the firmware (520) may be located in an optical detector or elsewhere in a network element.

As illustrated in FIG. 5.1, in Step 541, channel estimates are generated. In Step 542, channel properties are determined. In Step 543, a channel summary is determined. In Step 544, a channel summary is stored in a hardware register. In Step 545, a channel summary is stored in firmware memory. In Step 546, the channel summary is processed for a network. Thus, as shown in FIG. 5.1, the hardware (510) performs the operations between generating channel estimates to producing the corresponding channel summary. Accordingly, the firmware (520) accesses the channel summary in the hardware register and writes the channel summary to firmware memory. Accordingly, the firmware (520) may relay the channel summary to a computer memory where the channel summary may be further relayed over the control plane (530). Therefore, FIG. 5.1 provides for the scenario within an optical detector with a low amount of data bandwidth between the hardware and the firmware. Much of the channel property processing to determine the channel summary may then occur on the hardware side.

As illustrated in FIG. 5.2, in Step 551, channel estimates are generated. In Step 552, channel properties are stored in a hardware register. In Step 553, various channel properties are determined. In Step 554, a channel summary is determined. In Step 555, a channel summary is stored in firmware memory. In Step 556, the channel summary is processed for a network. Thus, as shown in FIG. 5.2, the hardware (510) performs the operations between generating channel estimates and storing the channel estimates in a hardware register. Accordingly, the firmware (520) accesses the channel estimates in the hardware register to determine the channel properties and thus the channel summary. Accordingly, the firmware (520) stores the channel summary in firmware memory before being relayed for processing over the control plane (530). Therefore, FIG. 5.2 provides for the scenario within an optical detector with a high amount of data bandwidth between the hardware and the firmware. Much of the channel property processing may then occur on the firmware side.

As illustrated in FIG. 5.3, in Step 561, channel estimates are generated. In Step 562, the channel estimates are stored in a hardware register. In Step 563, the channel estimates are stored in firmware memory. In Step 564, channel properties are determined. In Step 565, a channel summary is determined. In Step 566, the channel summary is processed for a network. Thus, as shown in FIG. 5.3, the hardware (510) performs the operations between generating channel estimates and storing the channel estimates in a hardware register. Accordingly, the firmware (520) accesses the channel estimates in the hardware register and relays the channel estimates to a computer memory where the channel estimates are subsequently transmitted over the control plane (530). In the control plane (530), the channel properties and channel summary are determined accordingly. Therefore, FIG. 5.3 provides for the scenario within an optical detector with a high amount of data bandwidth between an optical detector and a control plane on a network. As such, the channel property processing and channel summary determination may occur on the control plane (530).

As illustrated in FIG. 5.4, in Step 571, channel estimates are generated. In Step 572, the channel estimates are stored in a hardware register. In Step 573, the channel properties are determined. In Step 574, the channel properties are stored in firmware memory. In Step 575, a channel summary is determined. In Step 576, the channel summary is processed for a network. Thus, as shown in FIG. 5.4, the hardware (510) performs the operations between generating channel estimates and storing the channel estimates in a hardware register. Accordingly, the firmware (520) accesses the channel estimates in the hardware register, and determines channel properties accordingly. Thus, the firmware (520) stores the channel properties in firmware memory before being relayed to computer memory and thus are transmitted over the control plane (530). In the control plane (530), the channel summary is determined accordingly. Therefore, FIG. 5.4 provides for a split scenario between an optical detector and a control plane. As shown, the channel property processing and the channel summary processing is divided between the firmware (520) in the optical detector and the control plane (530).

As illustrated in FIG. 5.5, in Step 581, channel estimates are generated. In Step 582, the channel properties are determined. In Step 583, the channel properties are stored in a hardware register. In Step 584, a channel summary is determined. In Step 585, the channel summary is stored in firmware memory. In Step 586, the channel summary is processed for a network. Thus, as shown in FIG. 5.5, the hardware (510) performs the operations between generating channel estimates and determining the channel properties, and thus stores the channel properties in a hardware register. Accordingly, the firmware (520) accesses the channel properties in the hardware register to determine channel summary accordingly. Thus, the firmware (520) stores the channel summary in firmware memory before relaying the channel summary to computer memory and thus transmitted over the control plane (530). In the control plane (530), the channel summary is processed accordingly. Therefore, FIG. 5.5 provides for a split scenario between hardware and firmware on an optical detector. As shown, the channel property processing and the channel summary processing is divided between the hardware (510) and the firmware (520) in the optical detector.

As shown above in FIGS. 5.1-5.5, various distributions of steps may exist among hardware (510), firmware (520), and a control plane (530) for performing optical telemetry throughout a network. Thus, a particular distribution may be selected depending on the data bandwidth between the hardware (510) and firmware (530), between the firmware (520) and a computer processor, and/or between the computer processor and network bandwidth on the control plane (530).

Figure 6:
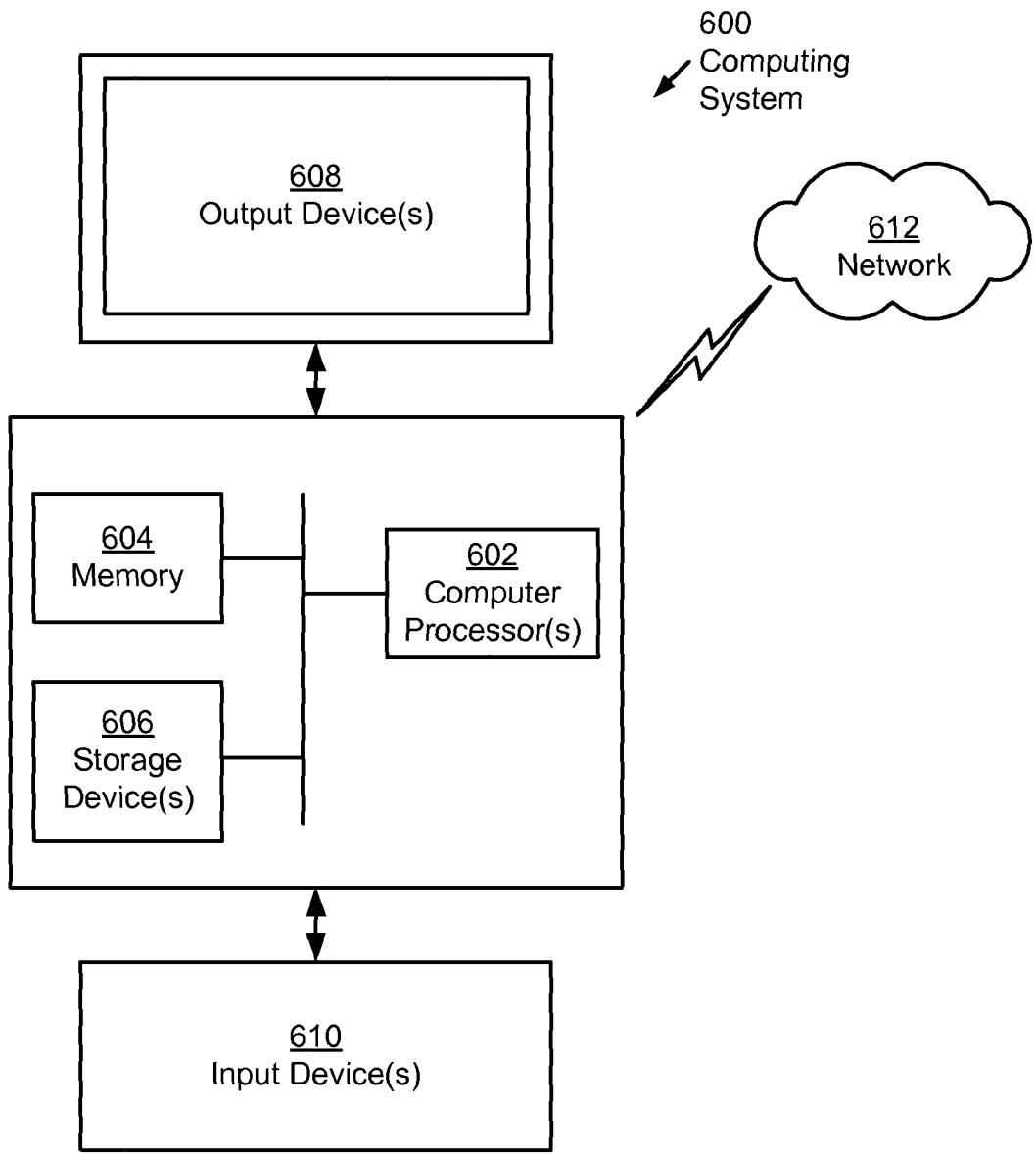
FIG. 6 shows a computing system in accordance with one or more embodiments.

Embodiments may be implemented on a computing system. Any combination of mobile, desktop, server, router, switch, network element, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing optical channel telemetry, comprising:
   generating a plurality of channel estimates of an optical channel, wherein the plurality of channel estimates are generated according to a hardware sampling that is performed by hardware in an optical detector located in a network element;
   determining, from the plurality of channel estimates, a plurality of channel properties regarding the optical channel;
   determining a channel summary using a summarization function and the plurality of channel properties;
   storing the channel summary in a hardware register in the network element, wherein the hardware register is sampled by a computer processor in the network element according to a processor interval, and wherein the channel summary describes a portion of the optical channel between samples of the processor interval; and
   transmitting, over a network, the channel summary to an optical network controller.

2. The method of claim 1, further comprising:
   determining, from the plurality of channel estimates, a first value of a channel property, a second value of the channel property, and a third value of the channel property;
   determining a first absolute value of a difference between the first value and the second value;
   determining a second absolute value of a difference between the second value and the third value; and
   determining an accumulated value by summing the first absolute value and the second absolute value,
   wherein the channel summary corresponds to the accumulated value.

3. The method of claim 1, further comprising:
   accumulating, using the plurality of channel estimates, a plurality of changes to a channel property of the optical channel to produce an accumulated change in the channel property;
   determining that the accumulated change in the channel property is above a predetermined threshold; and
   transmitting, in response to determining that the accumulated change is above the predetermined threshold, the accumulated change to the optical network controller.

4. The method of claim 1,
   wherein the summarization function determines a change of a channel property between a first channel estimate and a second channel estimate generated during a predetermined period of time, and
   wherein the channel summary corresponds to a determined value of the change of the channel property.

5. The method of claim 1,
   wherein the plurality of channel properties are determined by a first hardware in the optical detector,
   wherein the summarization function is performed on the plurality of channel estimates by a second hardware in the optical detector, and
   wherein the channel summary is stored in a firmware memory in the optical detector.

6. The method of claim 1, further comprising:
   equalizing, using the plurality of channel estimates, a plurality of optical symbols to produce a plurality of estimated symbols,
   wherein the plurality of optical symbols are received from an optical transmission medium over the optical channel, and
   wherein the plurality of estimated symbols are decoded to determine data sent by a network element.

7. The method of claim 1,
   wherein the plurality of channel estimates are generated according to a rate that the optical detector receives a plurality of optical symbols over an optical transmission medium.

8. The method of claim 1,
   wherein the plurality of channel estimates are generated according to a rate that an equalizer inside the optical detector is updated for estimating the optical channel.

9. A method for performing optical channel telemetry, comprising:
   generating a plurality of channel estimates of an optical channel, wherein the plurality of channel estimates are generated by an optical detector;
   determining, from the plurality of channel estimates, a plurality of channel properties regarding the optical channel;
   determining, using a summarization function and the plurality of channel properties, a channel summary that describes a portion of the optical channel during a predetermined period of time, wherein the predetermined period of time corresponds to a processor interval of a computer processor;

transmitting, over a network, the channel summary to an optical network controller;

determining a classification zone for a channel property type from a plurality of classification zones, wherein the classification zone is based on a plurality of historical properties for the optical channel;

comparing the plurality of historical properties and the plurality of channel properties; and adjusting, using a machine learning algorithm and in response to comparing the plurality of historical properties and the plurality of channel properties, the classification zone to produce an adjusted classification zone.

10. The method of claim 9, wherein the machine learning algorithm determines which channel properties correspond to the classification zone using statistical sampling of the plurality of historical properties and the plurality of channel properties.

11. The method of claim 9, wherein the plurality of channel estimates are stored in a plurality of hardware registers in the optical detector, and wherein the plurality of channel properties and the channel summary are determined by firmware that reads the plurality of hardware registers.

12. The method of claim 9, wherein the plurality of channel properties and the channel summary are determined by a control plane, and wherein the control plane processes the channel summary in a network database that stores a plurality of channel summaries obtained from a plurality of network elements.

13. The method of claim 9, wherein the summarization function is a discrete Fourier transform, wherein the summarization function is performed on the plurality of channel properties to produce a plurality of Fourier coefficients, and wherein the channel summary indicates, based on the plurality of Fourier coefficients, whether a transient event is above a predetermined threshold within a predetermined period of time.

14. A network element, comprising:

a computer processor;

a computer memory coupled to the computer processor;

an optical detector coupled to an optical transmission medium, wherein the optical detector is configured to:
generate a plurality of channel estimates of an optical channel according to a hardware sampling by hardware in the optical detector,
determine, from the plurality of channel estimates, a plurality of channel properties regarding the optical channel; and an optical summarizer coupled to the computer memory, a hardware register, and the optical detector, wherein the optical summarizer is configured to:
determine a channel summary using a summarization function and the plurality of channel properties, and
store the channel summary in the hardware register,
wherein the computer processor is configured to sample the hardware register according to a processor interval,
wherein the channel summary describes a portion of the optical channel between samples of the processor interval,
and wherein the computer processor is configured to transmit, over a network, the channel summary to an optical network controller.

15. The network element of claim 14, wherein the optical detector comprises a first hardware, a second hardware, and a firmware memory, wherein the first hardware is configured to determine the plurality of channel properties from the plurality of channel estimates, wherein the second hardware is configured to perform the summarization function on the plurality of channel properties to produce the channel summary, and wherein the channel summary is stored in the firmware memory.

16. The network element of claim 14, further comprising:

a plurality of hardware registers that store the plurality of channel estimates, and wherein the optical detector comprises firmware configured to:
read the plurality of hardware registers to obtain the plurality of channel estimates, and
determine, using the plurality of channel estimates, the plurality of channel properties.

17. The network element of claim 14, wherein the optical network controller is located in a control plane operating on a plurality of network elements, and wherein the optical network controller is configured to store the channel summary in a network database that stores a plurality of channel summaries obtained from the plurality of network elements.

18. The network element of claim 14, further comprising:

an equalizer configured to, using the plurality of channel estimates and a plurality of optical symbols, produce a plurality of estimated symbols, wherein the optical detector is further configured to receive the plurality of optical symbols from the optical transmission medium over the optical channel.

\* \* \* \* \*